United States Patent

Höfner et al.

[11] Patent Number: 5,794,938
[45] Date of Patent: Aug. 18, 1998

[54] BRUSH SEAL SECURED BY A C-SHAPED CLAMPING RING

[75] Inventors: Hermann Höfner, München; Alfred Mayr, Röhrmoos, both of Germany

[73] Assignee: Mtu Motoren-Und Turbinen-Union München GmbH, Munich, Germany

[21] Appl. No.: 775,710

[22] Filed: Dec. 17, 1996

[30] Foreign Application Priority Data

Jan. 8, 1996 [DE] Germany ............ 296 00 193.7

[51] Int. Cl.⁶ .................................. F16J 15/447
[52] U.S. Cl. ............................ 277/53; 277/184
[58] Field of Search ................. 277/53, 184, 189; 415/173.3, 173.5, 174.2, 174.5

[56] References Cited

U.S. PATENT DOCUMENTS

| | | | |
|---|---|---|---|
| 885,032 | 4/1908 | Ferranti | 277/53 |
| 4,159,828 | 7/1979 | Ostling et al. | 277/53 |
| 4,779,904 | 10/1988 | Rich | 277/53 |
| 4,781,388 | 11/1988 | Wohrl et al. | 277/184 |
| 4,989,886 | 2/1991 | Rulis | 277/53 |
| 5,066,024 | 11/1991 | Reisinger et al. | 277/53 |
| 5,316,318 | 5/1994 | Veau | 277/53 |

FOREIGN PATENT DOCUMENTS

| | | | |
|---|---|---|---|
| 1952984 | 4/1970 | Germany | 277/53 |
| 3907614 | 9/1990 | Germany | |

Primary Examiner—Scott Cummings
Attorney, Agent, or Firm—Ladas & Parry

[57] ABSTRACT

A brush seal for sealing a gap between two spaces at different pressures on opposite sides of a rotor and a stator. The brush seal is formed as a plurality of bristles and the bristles are mounted in the stator to project radially therefrom, across said gap, to contact the rotor. A clamping ring clamps a stack of the bristles around an annular core in U-shaped fashion with legs of the bristles extending through an annular slot towards the rotor. The clamping ring includes a C-shaped section which clamps the bristles against the core and reverse bend portions at opposite ends of the C-shaped section. The reverse bend portions are axially spaced from one another and form the annular slot through which the legs of the bristles extend.

8 Claims, 1 Drawing Sheet

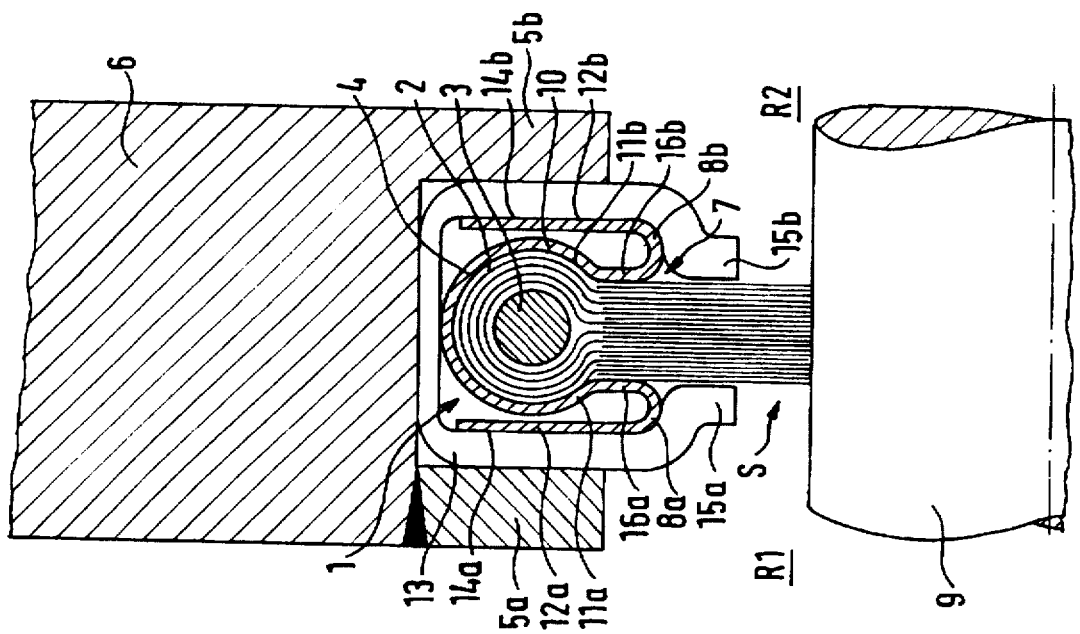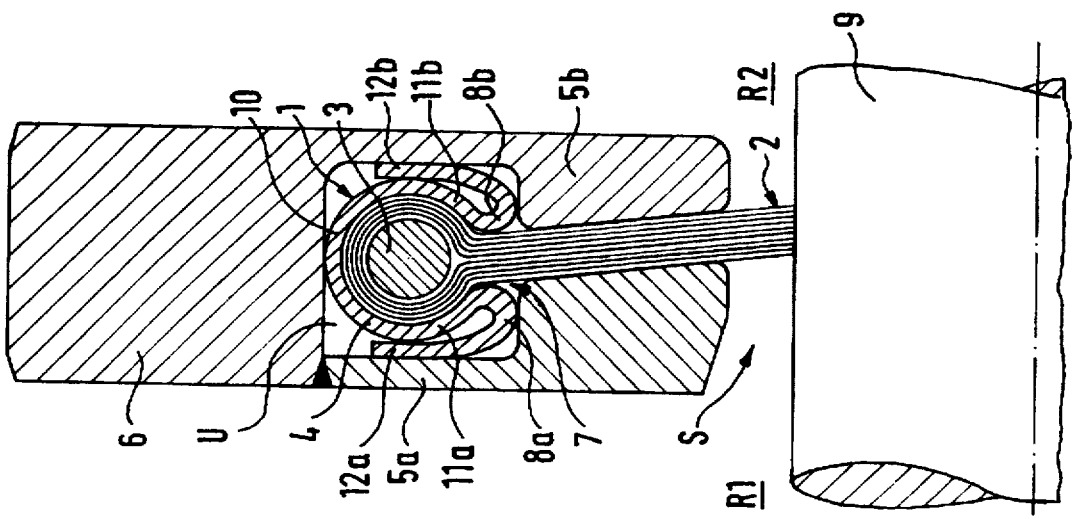

BRUSH SEAL SECURED BY A C-SHAPED CLAMPING RING

FIELD OF THE INVENTION

The invention relates to a brush seal for sealing a gap between two spaces at different pressures on opposite sides of a rotor and stator, as for example, in a turbo engine.

More particularly, the invention relates to such a brush seal secured by a C-shaped clamping ring.

BACKGROUND AND PRIOR ART

A brush seal of the above type is disclosed in DE 39 07 614. Such a brush seal is secured in a stator housing and surrounds a rotor concentrically so that stacked bristles of the brush seal extend inwardly radially, or at a slight angle, to cause inner ends of the bristles to contact the periphery of the rotor and provide a seal between the spaces at different pressures on opposite sides of the brush seal. Due to their elasticity, the bristles compensate for rotor or shaft eccentricities and rotor balance errors.

In order not to adversely affect the safe operation of the rotor-stator assembly, for example, in a turbo engine, a rigid seating of the bristles in a bristle carrier must be assured during operation. As shown in DE 39 07 614, the bristles encircle a core ring which is concentric with the rotor, and a clamping ring of C-shaped cross section surrounds the bristles and clamps them to the core ring. The ends of the bristles project through a peripheral slot in the clamping ring and extend towards the rotor. The clamping ring is formed as a slotted tube. However, in operation, pressure is produced on the bristles along the edges of the slot in the clamping ring particularly when only a small edge radius is provided at the peripheral slot of the clamping ring. This leads to premature wear of the bristles. This is particularly true for the desired use of very fine or extremely thin bristles. The edge pressure originates due to the dimensions of the structural elements, which cannot be maintained extremely accurately, as well as due to the type of brush fastening and beveling and results from manufacturing technology.

SUMMARY OF THE INVENTION

An object of the invention is to provide a brush seal of the above type which avoids the problem of bristle wear, while providing a simple method of manufacture of the brush seal.

In accordance with the invention, the clamping ring is provided with reverse bend portions at opposite ends of the C-shaped section, which bend portions are axially spaced from one another to form the annular slot through which the legs of the bristles extend. Anchor portions, in the form of backing elements, extend radially from the reverse bend portions in a direction away from the annular slot and serve for seating the clamping ring in the stator.

The construction according to the invention has the advantage that, on the one hand, large bend radii can be provided at the reverse bend portions of the clamping ring to prevent bristle wear and, on the other hand, the clamping ring can be produced by a simple bending operation of an annular sheet. The reverse bend portions of large bending radii, minimize edge pressure on the relatively thin bristles and this is of particular importance when the bristles are made of silicon carbide which are particularly sensitive to edge pressure due to their brittleness.

In further accordance with the invention, the clamping ring can be provided with a transition region between the reverse bend portions and the ends of the C-shaped section at which parallel support surfaces are formed extending radially and peripherally for guiding the bristles between the C-shaped section and the reverse bend portions.

In further accordance with the invention, the clamping ring can be mounted in a hollow ring member which is secured in a recess in the stator. The hollow ring member is formed with a clearance in continuation of the annular slot in the clamping ring and through which the bristles pass towards the rotor.

BRIEF DESCRIPTION OF THE FIGURES OF THE DRAWING

FIG. 1 is an axial, sectional view through a rotor-stator assembly in which a brush seal according to the invention is directly secured in the stator.

FIG. 2 is an axial, sectional view of the rotor-stator assembly in which a modified brush seal according to another embodiment of the invention is installed in a separate housing in the stator.

DETAILED DESCRIPTION OF PREFERRED EMBODIMENTS

Referring to FIG. 1, therein is shown a brush seal 1 for a turbo engine which is not shown in detail. The brush seal 1 is intended to seal spaces R1 and R2 in the engine which are at different pressures.

In order to mount the brush seal in the stator of the turbo engine, an annular core ring 3 is provided and a plurality of stacked bristles 2 of the brush seal 1 are clamped by a clamping ring 4 against the core ring 3. The bristles 2 can be made of silicon carbide. The bristles 2 are clamped in U-shape around the core ring 3 and legs of the bristles extend through an annular slot 7 in the clamping ring towards the rotor 9. The clamping ring 4 is secured in an annular space U formed between two housing portions 5a and 5b of stator 6.

In accordance with the invention, the peripheral slot 7 is formed between two reverse bend portions 8a and 8b of clamping ring 4, which are axially spaced from one another. The legs of the U-shaped bristles 2 clamped around the core ring 3, project substantially radially through peripheral slot 7 inwardly and are sealed against the outer periphery of rotor 9. Accordingly, the bristles 2 seal the gap S between the stator 6 and rotor 9. Eccentricities of the rotor shaft and imbalance of the rotor are compensated by elastic bending of bristles 2. Compensation can even be made for extreme variation in the size of the radial gap 7.

The C-shaped section 10 of the clamping ring 4, insures that the bristles 2 will be clamped against the core ring 3 concentrically with the C-shaped section. The opposite branches 11a and 11b of C-shaped section 10, merge with the reverse bend portions 8a, 8b and form the peripheral slot 7. The reverse bend portions 8a and 8b each extend into outwardly projecting radial anchor portions which form backing elements 12a and 12b that tangentially contact the C-shaped section 10. The brush seal 1 is mounted in the stator by clamping the backing elements 12a and 12b between housing portions 5a and 5b of the stator 6. The housing portions 5a and 5b are axially spaced from one another to develop a clamping force by which the clamping ring 4 anchors the bristles 2 on the ring 3.

In the embodiment illustrated in FIG. 2, a separate hollow ring member 13 receives the clamping ring 4, core ring 3 and bristles 2 in an internal recess 21 of rectangular cross section in stator 6. The clamping ring 4 is clamped by means of backing elements 12a, 12b which extend parallel to one another between parallel inside surfaces 14a and 14b of ring 13. The axial spacing between the surfaces 14a and 14b, is such that the clamping force applied to the clamping ring securely anchors the bristles 2 on core 3 by the C-shaped section 10 of the clamping ring. The ring 13 is secured in a rigid position in the stator housing 6. The ring 13 is provided with two radial extensions 15a and 15b in radial extension of the peripheral slot 7. The extensions 15a and 15b are axially spaced from one another. The clamping ring is formed with support surfaces 16a and 16b extending parallel to one another at an axial spacing therebetween for guiding the bristles 2 in a transition region between the C-shaped section and the reverse bend portions 8a, 8b.

As a result of the formation of the mounting means for the brush seal in the stator, wear of the bristles is minimized and the manufacture of the assembly is simplified, particularly due to the simplicity of formation of the reverse bend portions on the annular sheet after the C-shaped section.

Although the invention has been described in relation to a specific embodiment thereof, it will become apparent to those skilled in the art that numerous modifications and variations can be made within the scope and spirit of the invention as defined in the attached claims.

What is claimed is:

1. A brush seal for sealing a gap between two spaces at different pressures on opposite sides of a rotor and a stator, said brush seal comprising a plurality of bristles and mounting means for mounting said bristles in the stator to project substantially radially therefrom, across said gap, to contact said rotor, said mounting means comprising an annular core, and a clamping ring having an annular slot, said clamping ring engaging a stack of said bristles to clamp said bristles around said core in U-shaped fashion with legs of said bristles extending through said annular slot towards said rotor, said clamping ring including a C-shaped section which clamps the bristles against said core and reverse bend portions at opposite ends of said C-shaped section, said reverse bend portions being axially spaced from one another to form said annular slot through which said legs of the bristles extend, said clamping ring further including anchor portions extending radially from said reverse bend portions in a direction away from said annular slot, said anchor portions being formed as backing elements which are seated in said stator.

2. A brush seal as claimed in claim 1, wherein said clamping ring has support surfaces extending radially and peripherally for guiding said bristles in a transition region between said C-shaped section and said reverse bend portions.

3. A brush seal as claimed in claim 1, wherein said backing elements of the clamping ring tangentially contact said C-shaped portion of the clamping ring.

4. A brush seal as claimed in claim 1, wherein said bristles are made of silicon carbide.

5. A brush seal as claimed in claim 2, wherein said support surfaces are substantially parallel to one another.

6. A brush seal as claimed in claim 1, wherein said stator has an annular recess receiving said mounting means, said mounting means further comprising a hollow ring member secured in said recess in said stator, said clamping ring being engaged in said hollow ring member, said hollow ring member having a clearance in continuation of said annular slot in said clamping ring and through which said bristles pass towards said rotor.

7. A brush seal as claimed in claim 6, wherein said backing portions extend from said reverse bend portions into adjoining relation with said C-shaped section.

8. A brush seal as claimed in claim 1, wherein said clamping ring comprises an annular sheet formed with said C-shaped section and said reverse bend portions.

* * * * *